US006871187B1

(12) United States Patent
Gosko

(10) Patent No.: US 6,871,187 B1
(45) Date of Patent: Mar. 22, 2005

(54) TRANSLATOR FOR USE IN AN AUTOMATED ORDER ENTRY SYSTEM

(75) Inventor: Theresa M. Gosko, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 652 days.

(21) Appl. No.: 09/592,739

(22) Filed: Jun. 13, 2000

(51) Int. Cl.[7] .......................... G06F 17/60; G06F 7/00; G06F 17/30
(52) U.S. Cl. ..................... 705/26; 707/100; 707/102; 707/201; 707/203
(58) Field of Search ................... 707/102, 100, 707/201, 203, 101; 705/26, 1, 27, 28, 30; 703/13, 27

(56) References Cited

U.S. PATENT DOCUMENTS

| | | | |
|---|---|---|---|
| 4,959,686 A | 9/1990 | Spallone et al. | 364/401 |
| 4,972,318 A | 11/1990 | Brown et al. | 364/403 |
| 5,202,977 A * | 4/1993 | Pasetes, Jr. et al. | 703/27 |
| 5,319,542 A | 6/1994 | King, Jr. et al. | 364/401 |
| 5,325,304 A | 6/1994 | Aoki | 364/468 |
| 5,465,290 A | 11/1995 | Hampton et al. | 379/67 |
| 5,611,051 A | 3/1997 | Pirelli | 395/210 |
| 5,699,526 A | 12/1997 | Siefert | 395/227 |
| 5,712,989 A | 1/1998 | Johnson et al. | 395/228 |
| 5,765,143 A | 6/1998 | Sheldon et al. | 705/28 |
| 5,819,107 A | 10/1998 | Lichtman et al. | 395/828 |
| 5,825,651 A | 10/1998 | Gupta et al. | 364/468.09 |
| 5,870,717 A | 2/1999 | Wiecha | 705/26 |
| 5,870,719 A | 2/1999 | Maritzen et al. | 705/26 |

FOREIGN PATENT DOCUMENTS

EP 454303 A2 * 10/1991 .......... G06F/13/38

OTHER PUBLICATIONS

American National Standard for electronic business data interchange, data element dictionary, May 1984.*
American National Standard for electronic business data interchange, 832 Price Sales Catalog, Version 003, Release 010, May 1996, pp. 89–126.*
832 Price/Sales Catalog Transaction Set, Mar. 1996, Release—003050FED00A, pp. 5–71.*
Theresa M. Gosko, *An Automated Configuration Catalog*, filed Jun. 13, 2000, U.S. Appl. No. 09/593,112.
Theresa M. Gosko and Yu Fang, *A Translation System for Configurable Data*, filed Jun. 13, 2000, U.S. Appl. No. 09/593,590.
Theresa M. Gosko, *A Customer–Hosted Automated Configuration Catalog*, filed Jun. 13, 2000, U.S. Appl. No. 09/593,727.
David Clifton, Laurie Dolan, and Adam Moore, *Tool For Facilitating On–Line Ordering Of Build–to–Order Product*, filed Jun. 25, 1999, U.S. Appl. No. 09/344,072.
David Clifton, Laurie Dolan, Adam Moore, and Dan Isaacs, *Quote–to–Order On–Line Tool*, filed Jun. 25, 1999, U.S. Appl. No. 09/344,391.

(List continued on next page.)

Primary Examiner—Richard Chilcot
Assistant Examiner—J Harle
(74) Attorney, Agent, or Firm—Hamilton & Terrile, LLP; Stephen A. Terrile

(57) ABSTRACT

Translations for data structures for transferring catalog and system order information between a manufacturer and a customer. The translations and data structures are configured to allow custom systems to be automatically ordered where the manufacturer and customer use different file formats. These translations and data structures advantageously allow a manufacturer and customer to electronically order systems, and specifically, non-commodity systems, quickly and easily.

10 Claims, 4 Drawing Sheets

U.S. PATENT DOCUMENTS

| | | | |
|---|---|---|---|
| 5,909,570 A * | 6/1999 | Webber | 703/13 |
| 5,946,663 A | 8/1999 | Tanaka et al. | 705/8 |
| 5,963,919 A | 10/1999 | Brinkley et al. | 705/28 |
| 5,983,200 A | 11/1999 | Slotznick | 705/26 |
| 6,014,637 A | 1/2000 | Fell et al. | 705/26 |
| 6,052,670 A | 4/2000 | Johnson | 705/27 |
| 6,055,516 A | 4/2000 | Johnson et al. | 705/27 |
| 6,115,641 A | 9/2000 | Brown et al. | 700/102 |
| 6,117,180 A | 9/2000 | Dave et al. | 703/20 |
| 6,119,102 A | 9/2000 | Rush et al. | 705/29 |
| 6,167,383 A | 12/2000 | Henson | 705/26 |
| 6,253,188 B1 | 6/2001 | Witek et al. | 705/14 |
| 6,292,784 B1 | 9/2001 | Martin et al. | 705/11 |
| 6,314,415 B1 | 11/2001 | Mukherjee | 706/47 |
| 6,317,648 B1 | 11/2001 | Sleep et al. | 700/216 |
| 6,366,914 B1 | 4/2002 | Stern | 707/10 |
| 6,408,303 B1 * | 6/2002 | Richards | 707/102 |
| 6,415,196 B1 | 7/2002 | Crampton et al. | 700/99 |
| 6,427,091 B1 | 7/2002 | Davis et al. | 700/115 |
| 6,442,748 B1 * | 8/2002 | Bowman-Amuah | 717/3 |
| 6,487,623 B1 | 11/2002 | Emerson et al. | 710/302 |
| 6,502,102 B1 | 12/2002 | Haswell et al. | 707/102 |
| 6,542,912 B2 * | 4/2003 | Meltzer et al. | 707/501.1 |

OTHER PUBLICATIONS

David M. Brooke and Steve M. Saxon, *Database Facility for XML Server Pages Language*, filed Sep. 20, 1999, U.S. Appl. No. 09/399,506.

Theresa M. Gosko, *Data Structure for Use in an Automated Order Entry System*, filed Jun. 13, 2000, U.S. Appl. No. 09/592,741.

Theresa M. Gosko, Joyce J. Sham, Reynaldo Ortega, Jr., Yu Fang, and Emil A. Harsa, *A System and Method for an Automated Ordering Process*, filed Jun. 13, 2000, U.S. Appl. No. 09/593,109.

Theresa M. Gosko, Joyce J. Sham, Reynaldo Ortega, Jr., Yu Fang, and Emil A. Harsa, *A System and Method for an Automated Inventory Process*, filed Jun. 13, 2000, U.S. Appl. No. 09/593,110.

Geller, Scott "Come, and they will build it!" Manufacturing Systems; Wheaton; Jun. 1999.

* cited by examiner

TRANSLATOR FOR USE IN AN AUTOMATED ORDER ENTRY SYSTEM

CROSS REFERENCE TO RELATED APPLICATIONS

This application relates to application Ser. No. 09/593,109, filed Jun. 13, 2000, entitled "Data Structure for use in an Automatic Order Entry System" and naming Theresa M. Gosko, Joyce Sham, Reynaldo Ortega, Yu Fang and Emil Harsa, as inventors, the application being incorporated herein by reference in its entirety.

This application relates to application Ser. No. 09/593,110, filed Jun. 13, 2000, entitled "A System and Method for an Automated Inventory Process" and naming Theresa M. Gosko, Joyce Sham, Reynaldo Ortega, Yu Fang and Emil Harsa, as inventors, the application being incorporated herein by reference in its entirety.

This application relates to application Ser. No. 09/593,112, filed Jun. 13, 2000, entitled "An Automated Configuration Catalog" and naming Theresa M. Gosko, as inventor, the application being incorporated herein by reference in its entirety.

This application relates to application Ser. No. 09/592,741, filed Jun. 13, 2000, entitled "Data Structure for use in an Automatic Order Entry System" and naming Theresa M. Gosko, as inventor, the application being incorporated herein by reference in its entirety.

This application relates to application Ser. No. 09/593,727, filed Jun. 13, 2000, entitled "A Customer-Hosted Automated Configuration Catalog" naming Theresa M. Gosko, as inventor, the application being incorporated herein by reference in its entirety.

This application relates to application Ser. No. 09/593,590, filed Jun. 13, 2000 entitled "A Translation System for Configuration Data" and naming Theresa M. Gosko, and Yu Fang, as inventors, the application being incorporated herein by reference in its entirety.

BACKGROUND OF THE INVENTION

1. Field of the Invention

The present invention relates to automated order entry systems and more particularly to translators for use in automated order entry systems.

2. Description of the Related Art

Electronic commerce, or e-commerce includes the transfer of orders or other sales communications, credit information, electronic "funds", and digital products. Electronic commerce provides speed and convenience to many types of commercial activities. Interest in electronic commerce has heightened with the advent of widely accessible communication systems such as the Internet. Other types of electronic commerce include direct telephone line connections, interactive cable or television services, facsimile services, local and wide area network communications and the like. Electronic data communications technologies, particularly the Internet, have greatly enhanced marketing and retail opportunities and activities.

Electronic commerce has not been fully realized. There is a need to incorporate electronic communications technologies to synchronize customer interactions with businesses. More specifically, electronic commerce capabilities need to be expanded to synchronize business relationships with customers. For example, present electronic commerce businesses do not provide customers with the capability of configuring non-commodity items such as services and configuration options that permit a customer to create a product and order the product so created. Additionally, electronic commerce presently fails to provide cohesive, integrated manufacturing processes that automate customer relationships.

SUMMARY OF THE INVENTION

In accordance with the present invention, translations for data structures for transferring catalog and system order information between a manufacturer and a customer are shown. The translations and data structures are configured to allow custom systems to be automatically ordered where the manufacturer and customer use different file formats. These translations and data structures advantageously allow a manufacturer and customer to electronically order systems, and specifically, non-commodity systems, quickly and easily.

More specifically, in one aspect the invention relates to A method for translating a data structure for providing a catalog from a manufacturer to a customer from a first file format to a second file format. The method includes: translating a catalog header portion from the first file format to a corresponding set of elements in the second file format; translating a system identification portion from the first file format to a corresponding set of elements in the second file format; and; translating a system option portion from the first file format to a corresponding set of elements in the second file format. The system identification portion includes a system type indicator, the system type indicator indicating whether a system is a bundled system or a custom system.

In another aspect, the invention relates to A method for translating a data structure to a first file format from a second file format for providing an order to a manufacturer from a customer using a catalog that includes custom systems. The method includes: translating a plurality of elements in the second format to an order header portion in the first format; translating a plurality of elements in a second format to an order detail portion in the first format; and, translating a plurality of elements in the second format to an option detail portion in the first format. The order detail portion includes information about a specific configuration for the order. The option detail portion includes information allowing ordering of a custom system.

BRIEF DESCRIPTION OF THE DRAWINGS

The present invention may be better understood, and its numbers objects, features and advantages made apparent to those skilled in the art by referencing the accompanying drawings. The use of the same reference number throughout the several figures designates a like or similar element.

DETAILED DESCRIPTION

In the following description, for the purposes of explanation, numerous specific details are set forth in order to provide a thorough understanding of the present invention. It will be apparent, however, to a person of ordinary skill in the art that the present invention may be practiced without these specific details. In other instances, well-known structures and devices are shown in block diagram form in order to avoid unnecessarily obscuring the present invention.

Figure 1:
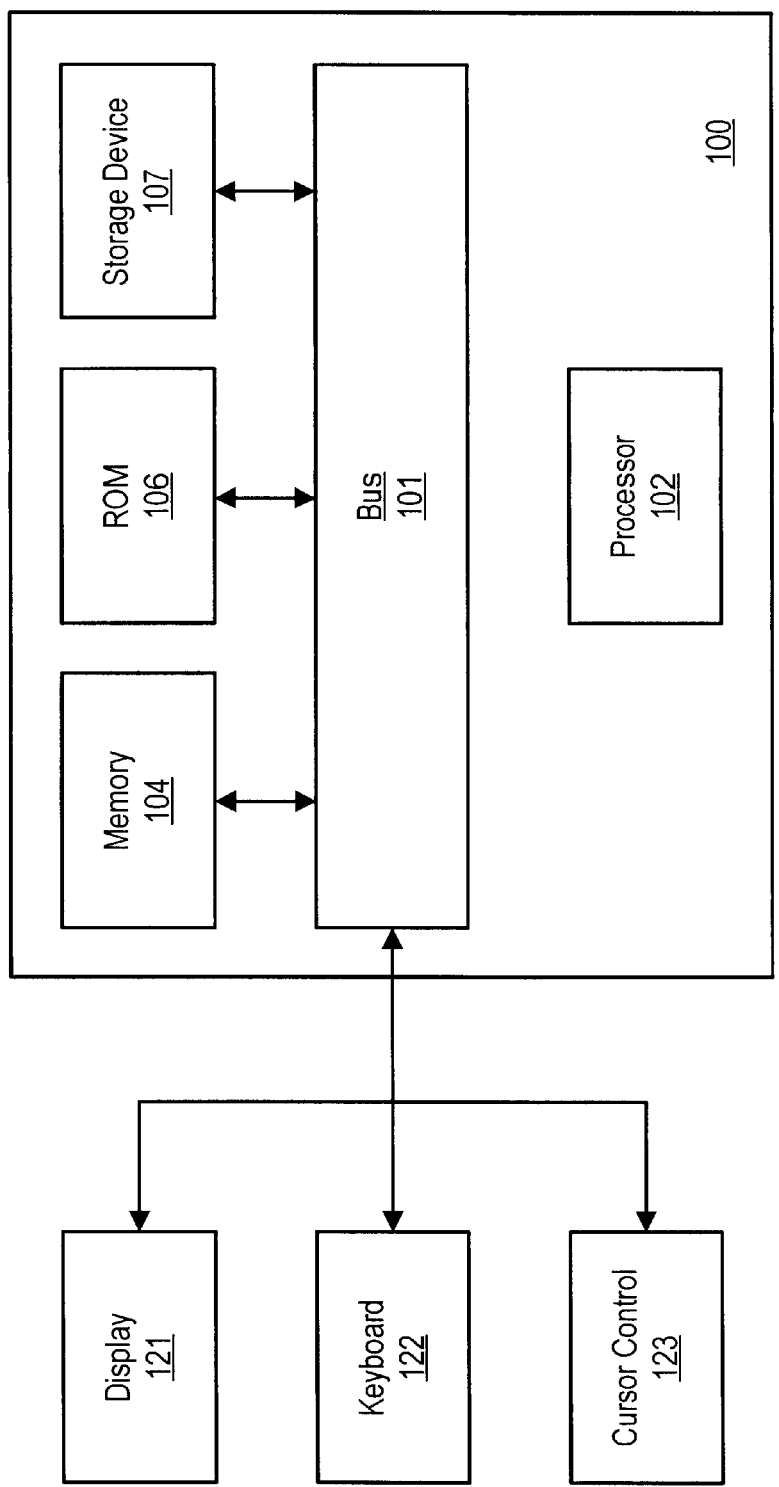
FIG. 1 is a block diagram of a computer system in accordance with an embodiment of the invention.

FIG. 1 illustrates a block diagram of a computer system 100 upon which an embodiment of the present invention may be implemented. Computer system 100 includes a bus 101 or other communication mechanism for communicating information, and a processor 102 coupled to bus 101 for processing information. Computer system 100 further comprises a memory dynamic storage 104 coupled to bus 101 for storing information and instructions to be executed by processor 102. Computer system 100 also includes a read only memory (ROM) and/or other static storage device 106 coupled to bus 101 for storing static information and instructions for processor 102. A data storage device 107, such as a magnetic disk or optical disk, is coupled to bus 101 for storing information and instructions.

Computer system 100 may also be coupled via bus 101 to a display device 121, such as a cathode ray tube (CRT), for displaying information to a computer user. Optionally, computer system 100 operates as a computer server or as a computer system coupled to a computer server. An input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

Figure 2:
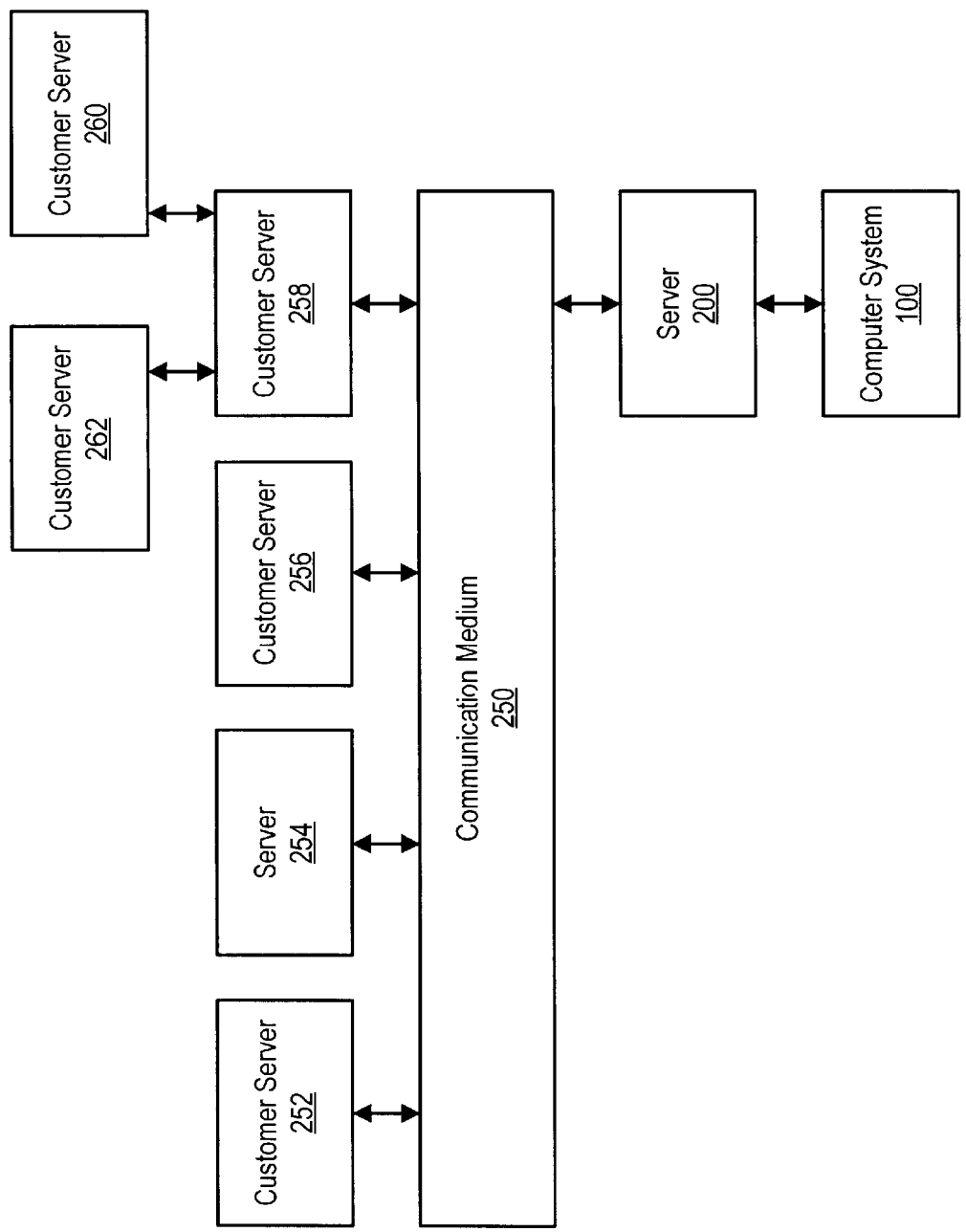
FIG. 2 is a block diagram of a computer server network including a communication medium in accordance with an embodiment of the invention.

Referring now to FIG. 2, computer system 100 is shown coupled to communication medium 250, which may be a multi-point network, a point-to-point communications link, etc. any of type of circuit-style network link capable of transferring data. Communication medium 250 may be an X0.25 circuit, a physical type of line, such as a T1 or E1 line, or an electronic industry association (EIA) 232 (RS-232) serial line. In addition, communication medium 250 may utilize a fiber optic cable, twisted pair conductors, coaxial cable, or a wireless communication system, such as a microwave communication system. Coupled to communication medium 250 is database server 200, which, according to an embodiment of the present invention, provides data across communication medium 250 to a plurality of servers, shown as servers 252, 254, 256 and 258. In an embodiment of the invention, servers 252, 254, 256 and 258 each represent servers of a customer or a third party in communication with customers via communication medium 250. For example, server 258 is shown further coupled to customer server 260 and customer server 262.

OVERVIEW

Figure 3:
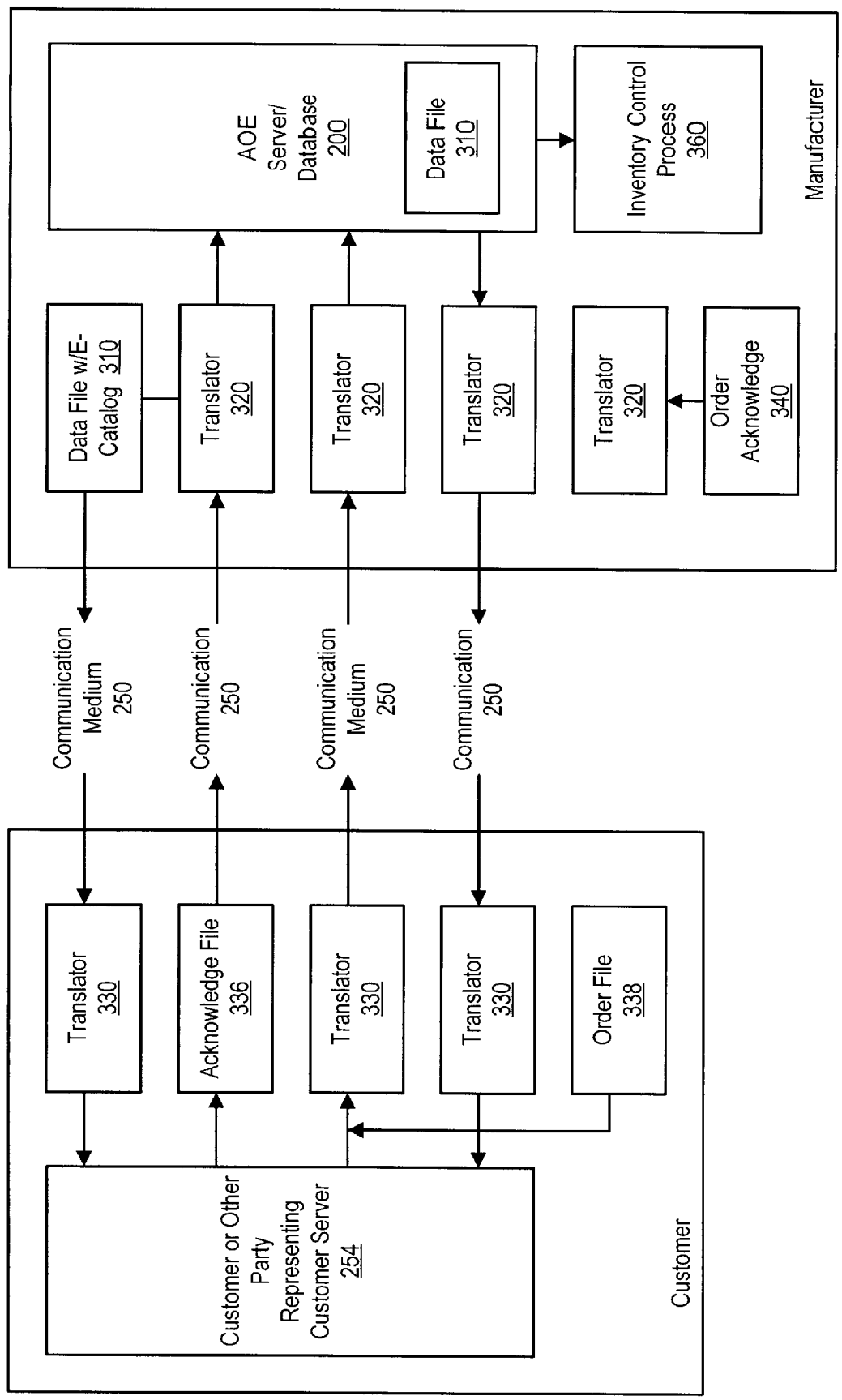
FIG. 3 is a block diagram of an automated order entry process in accordance with several embodiments of the invention.

The present invention is related to the use of computer systems and servers to facilitate and automate a manufacturing process, the process, hereinafter referred to as an Automated Order Entry (AoE) process, is outlined in FIG. 3. Referring to FIG. 3, the manufacturing process is shown including communication with customers via the communication medium 250 and server 200. The AoE process first includes creation of a data file 310 for transport via the communication medium 250. The data file 310 includes an electronic catalog suited for one or more customers. The catalog allows customers (as well as suppliers or third parties) to host the data and configure both commodity and non-commodity products and services, as explained in further detail below. The term "customer" or "customer hosted" includes third parties acting on behalf of a customer, supplier or manufacturer and hosting on behalf of the customer, supplier or manufacturer FIG. 3 shows a data file 310 including an electronic catalog transmitted from server 200 to a customer server 254. The data file is in a structured data format which is one of a proprietary format (PFF), EDI (Electronic Data Interchange) format, an SGML (Structured General Markup Language), such as XML (eXtensible Markup Language) or HTML, or another format familiar to persons of ordinary skill in the art. Data file 310 is in an industry supported communication protocol. For example, the data optionally may be configured to be transferred via a "value added network type protocol," or be configured for a direct connection with a customer via a T1 line, such as a direct "pipe" line, or be configured for a TCP/IP protocol. The data file 310 is optionally first translated in translator 320 to an industry standard format, such as Electronic Data Interchange (EDI), or, if not translated, transmitted in a proprietary format to customer server 254. The customer server receives data file 310 and acknowledges non-commodity or commodity product in the data file 310 using acknowledgement file 336.

The AoE process continues on the customer server 254, wherein the data file enables the customer to host data file 310 and create orders, including internal purchase orders and files for transport to the manufacturer server 200. The customer transmits the order file 338 via communication medium 250 to manufacturer server 200. The order file 338 is optionally translated via translator 330 to an industry standard format prior to transmitting the order file 338 via the communication medium 250. The manufacturer receives either a proprietary file format or an industry standard format order file 338. If the order file 338 is in an industry standard format, the order file is first translated in translator 320. The manufacturer acknowledges the order file 338, process the order file 338, thereby validating the order via order acknowledgement file 340. Acknowledgement file 340 is transmitted via communication medium 250 to customer server 254, and is optionally translated into an industry standard format in translator 320, and translated into a proprietary file format by the customer in translator 330.

The AoE process further includes an inventory control process by which appropriate data feeds inventory control process 360. In one embodiment, the catalog acknowledgement file 336, indicates whether the data file including the electronic catalog 310 was 'accepted' by the customer. If accepted, the data file 310 is made available by AoE server 200 within the AoE process to the inventory control process 360 to ensure appropriate inventory levels for products included in the electronic catalog that fall within a predetermined category of products. In another embodiment, the acknowledgement file 336 is not required to begin the inventory control process. For example, customers that lack the capability to send acknowledgment files. Such customers optionally may acknowledge and verify data files by other methods, such as a telephone call. Accordingly, in another embodiment, the inventory control process begins upon creation of the catalog or at other appropriate junctions within the manufacturing process. For example, certain catalogs include products that can be "bundled" as pre-built components, and other catalogs include products that are non-commodity type configurable products. Yet other catalogs include a mixture of both types of products. Each of these types of catalogs may be made available to the inventory control process.

Figure 4:
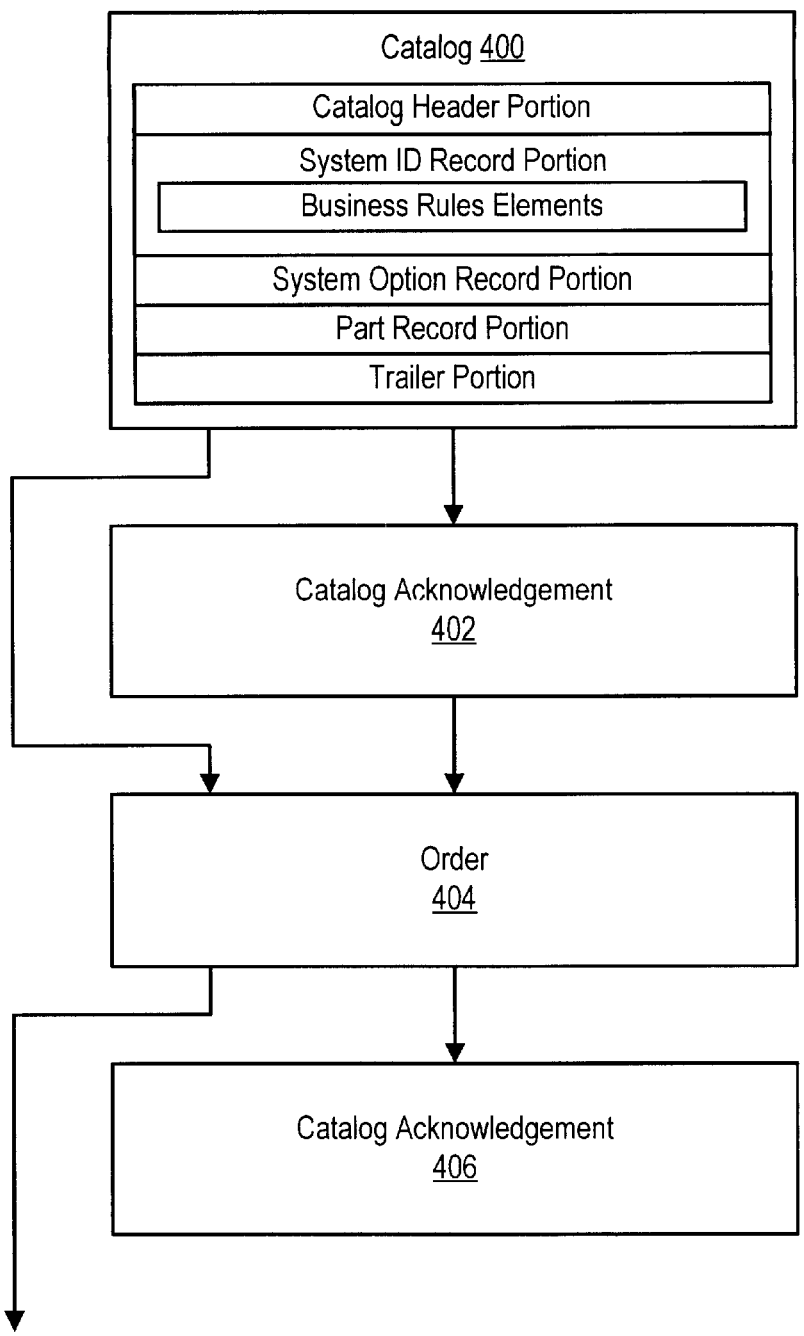
FIG. 4 is a block diagram of the data structures of the automated order entry process of FIG. 3.

FIG. 4 sets forth the flow of data structures to a customer from a manufacturer and to the manufacturer from a customer. More specifically, a Catalog data structure 400 is generated by AoE server Database 200 in a PFF. The Catalog data structure is then translated from the PFF data structure to an industry standard format. This data structure is transmitted to the customer via transmission medium 250. The customer then acknowledges receipt of the Catalog with a Catalog Acknowledgement data structure 402. The Catalog Acknowledgement data structure 402 is translated from an industry standard format to a PFF via translator 320. If, for a particular customer, no acknowledgement is required, then the customer can proceed directly with ordering from the catalog after receipt of the catalog. In either case, the next step is the generation of an Order data structure 404 by the customer. The Order data structure is transmitted to the manufacturer using an industry standard format. The Order data structure is translated from the industry standard format to a PFF via translator 320. Once the Order data structure is processed, then the manufacturer may optionally generate and provide an Order Acknowledgement data structure 406 to the customer. It will be appreciated that additional variations on this flow may be used by those skilled in the art. For example, order cancel/change data structures and order cancel/change acknowledgement data structures may also be used in this flow.

DATA STRUCTURES AND TRANSLATIONS

The following data structures and translations show the operation of translator 320 as well as the data structures that are transmitted via communication medium 250.

More specifically, Table 1 sets forth the proprietary file format (PFF) data structure and translation to an EDI format for a Catalog data structure 400. In Table 1 (as well as throughout the other Tables), the EDI structures are set forth on the left and the corresponding PFF structure are set forth on the right. For example, the EDI structure BCT.01 corresponds to and is translated from the PFF structure Catalog Type, the EDI structure BCT.02 corresponds to and is translated from the PFF structure Catalog Version Number, etc . . . . Translator 320 performs the translation for each data structure that is provided to communication medium 250.

TABLE 1

File name =
    CUSTOMERUSA + Date (ccyymmdd) + Sequence number + extension
    Example: CUSTOMERUSA199808313.CAT
File Wrapper:
Record tag: RTG From source: string length 30 ("DELLUSA")
    To destination: string length 10 ("CUSTOMERUSA")
    File type: string 15 ("CATALOG")
Catalog Header (occurs once for each catalog file):
Record tag:CAT

| | |
|---|---|
| BCT.01 | Catalog Type: (string length 1 - value D = Delta). |
| BCT.02 | Catalog Version Number: (number length 4 - values 1 to 9999). |
| DTM.02 | Catalog Date: (string length 10 - format mm/dd/yyyy). |
| DTM.03 | Catalog Time: (string length 8 - format hh:mm:ss). |
| DTM.04 | Catalog Time Code (string length 2 - value CS = Central Standard Time) |
| CUR.02(1) | Currency: (string length 3 - values USD or CAN). |
| CUR.03(1) | Exchange Rate: (number 10) |
| CUR.02(2) | Exchange From Currency/To Currency: (string length 3) |
| PER.02 | Catalog Contact: Dell Sales (string length 32 - i.e.: Stephan Moran). |
| PER.04 | Catalog Contact phone number (number length 10 - format 9999999999). |

System ID record (occurs once for each system type):
Record tag: SVS

| | |
|---|---|
| LIN.01 | Loop Counter: number length 5 (sequential counter). |
| LIN.03 | System ID: (number length 9 - values 1 to 999999999; Dell assigned). |
| LIN.05 | System ID Text description: (string length 30, "POWER PORTABLE BUNDLE"). |
| DTM.02(1) | System ID Effective Date: (string length 10 - format mm/dd/yyyy). |
| G53.01 | System ID Action: (string length 1 - values A = Add, R = Replace, D = Discontinue). |
| REF.02 | Replace Old System ID: (number length 9 - values 1 to 999999999). Note: When System Action = R |
| CTP.03(1) | System ID Purchase Price: (number length 10 - values .01 to 9999999.99). |
| CTP.03(2) | Default Shipping Price: (number length 10 - values .01 to 9999999.99). Note: If shipping is built into system ID. |
| TXI.02 | Sales Tax Amount: (number length 10 - values .01 to 9999999.99). Note: If sales tax is built into system ID. |
| C00101(CTP) | System Type: (string length 3 - values BNL = Bundle, CUS = custom). |
| PID.05(1-6) | System Specification Description (string length 480, system specifications) |
| DTM.02(2) | System Discontinue Date: (string length 10 - format mm/dd/yyyy). |

System Option Record (can occur multiple times for each system ID):
    Record tag: OPT

| | | |
|---|---|---|
| | SLN.02 | Relationship id: (string length 2 - values are "PO" for parent option, "CH" for child option, and "OR" for orphan option (no children) |
| | SI.07 | Record Type: (string length 2 - values default system configuration = CF, valid options for a system ID = OP). |
| | SI.03 | Option Indicator: (string length 7). Note: See Option Indicator values. |
| | SI.05 | Option Legend Code: (string length 7 - value 64 m, 128 m). |

TABLE 1-continued

| | |
|---|---|
| SI.02 | Option Action Code: (string length 1 - D = downgrade, U = upgrade, A = in addition, C = configuration) |
| PID.05 | Option Legend Friendly Description: (string length 60–64 Meg memory). |
| CTP.03 | Option Price: (number length 10 - values .01 to 9999999.99). Note: Roll up detail part number pricing. Will be dependant on the option action code as to what price it is |
| Part record (can occur multiple times for each System Option Record): | |
| Record tag: PRT | |
| SAC.13 | Part number: (number length 8 - values 230–1122). |
| SAC.10 | Part Quantity: (number length 4 - values 1 to 9999). |
| SAC.15 | Part Description: (string length 30 - values text description). |
| SAC.05 | Part Price: (number length 10 - values .01 to 9999999.99). Note: Part number contracted prices. |
| N/A | Additional Shipping Price: (number length 10 - values .01 to 9999999.99). Note: When applies, else it will be zero. |
| Trailer record (occurs once for each catalog file): | |

Record tag: TRL

With the Catalog data structure 400, Catalog header data applies to the entire file. Bundle record structure has a system ID record followed by the system option records that make up that system and for each option, the part numbers that make up that option. The record type is "CF", and there are no "OP" record types for a Bundle system ID; the system type is "BNL". Additionally, Custom configurations have a system ID record that represents the default system ID prior to choosing options. This is referred to as a default system ID and is followed by the option records that make up that default system, the part numbers that make up that option. The system options record type is "CF", and configuration records are followed with additional record types of "OP" to denote the valid options that are available for that default configuration. The system type is "CUS".

Catalog data structure 400 includes a number of portions as well as elements within these portions. More specifically, the Catalog data structure 400 includes a Catalog Header portion, a System ID record portion, a System Option Record portion, a Part record portion and a Trailer portion. The Catalog header portion includes a number of data elements that apply to the entire Catalog. The System ID record portion is system specific for each configuration identifier. The System Option Record portion includes all of the component information for a specific system. The Part Record portion includes the skew level details for a specific system. The Trailer portion allows for an application program to validate that all records for a configuration/product are complete.

The System ID record portion includes a plurality of business rule elements that apply to a particular system. More specifically, the System ID element provides a manufacturer assigned unique identifier. The system ID Text description element provides the text describing the supplier assigned identification. The System ID Effective Date element provides the effective date that a particular configuration is allowed to be purchased. The System ID Action element programmably tells a customer what an action to perform. For example, an Add value adds a new product, a Replace value allows a price refresh where the same product is used but with a new price, a Discontinue value discontinues a product. The Replace System ID element is used with the System ID Action element indicates a Replace function. The Replace System ID refers to an old product number when a new product number replaces the old product number. The Replace System ID element allows a customer to trigger any orders that have been started (within the customer's procurement system) to automatically update the pricing so that the whole ordering process does not have to be restarted. The System Type element tells a user whether a product is bundled, i.e., is a commodity item, or custom, i.e., is a non-commodity item. The System Discontinue Date element provides the date by which a system is discontinued. The System Discontinue Date element allows overlap of systems when discontinuing to flush out any pending (i.e., in process) orders. Alternately, the System Discontinue Date element may provide a hard drop date on which systems are discontinued.

The System Option Record portion includes a plurality of relationship indicator elements. More specifically, the Relationship id element provides an indicator that communicates for a component what the relationship of the component is with other components. For example, a PO (parent) value indicates that the component is a minisystem (or a solution), a CH (child) value indicates that the component is within a minisystem (i.e., is a child of the solution), a OR (orphan) value indicates that the component is optionally within a minisystem (i.e., is an orphan of the solution). The Record Type element determines whether the component is directly tied to a parent. I.e., the Record Type element shows whether an orphan is connected to the parent. The Option Indicator element shows what each component is (see, e.g., TABLE 2). The Option Legend Code element indicates the manufacturer code used to order a component as shown by the PFF. The Option Action Code element indicates that action that can be performed by a component.

Table 2 sets forth the option indicator values that are used by the data structure for the Option Indicator element of the Catalog data structure as well as other data structures of the AoE system. Providing a set of option indicator values allows a predefined cross-reference ability between the customer and the manufacturer, a customer to have a relationship and knowledge of what a non-commodity or commodity configuration includes.

TABLE 2

Option Indicator Values:

1 base-option = BASE
2 processor-option = PROC
3 memory-option = MEM
4 keyboard-option = KEYB
5 video-option = MONITOR
6 video-board-option = VIDB
7 video-memory-option = VIDM
8 hd-option = HD
9 ctl1-option = CNTRL

TABLE 2-continued

Option Indicator Values:

10 fd-option = FLPD
11 os-option = OS
12 point-option = MOUSE
13 nic-option = NIC
14 modem-option = MODEM
15 tbu-option = TAPEB
16 cdrom-option = CDROM
17 sound-option = SOUND
18 spkers-option = SPKERS
19 cache-option = CACHE
20 cable-option = CABLE
21 doc-dsk-option = DOCDSK
22 bundle-option = BUNDLE
23 hd-opt-option = HDOPT
24 ctl-opt-option = CNTRLO
25 sw1-option = SW1
26 sw2-option = SW2
27 opt1-option = OPT1
28 opt2-option = OPT2
29 initsvc-option = INITSVC
30 ext-svc-option = EXTSVC
31 dirline-option = DIRLINE
32 svc1-option = SVC1
33 svc2-option = SVC2
34 svc3-option = SVC3
35 svc4-option = SVC4
36 misc1-option = MISC1
37 misc2-option = MISC2
38 misc3-option = MISC3
39 misc4-option = MISC4
40 misc5-option = MISC5
41 misc6-option = MISC6
42 misc7-option = MISC7
43 system-integration = SI
44 comments = COMMENT
45 dock-sol = CSTMSOL
46 customer-kit = CUSTKIT
47 Dellware = DELLWAR Table 3 sets forth the PFF data structure and translation for the Catalog Acknowledgement data structure 402.

TABLE 3

File name =

DELLUSA + Date (ccyymmdd) + Sequence number + extension
The sequence number is 4 characters in length
Example: DELLUSA199808310003.CATACK
File Wrapper:
Record tag: RTG
From source: string length 10 ("CUSTOMERUSA")
To destination: string length 30 ("DELLUSA")
File type: string 15 ('CATACK")
Acknowledgment Header (occurs once for each catalog ack file):
Record tag: HDR
BGN.01 Transaction purpose code: (string length 2, value 06 = confirmation)
BGN.02 Reference ID (string length 30 - value, Dell Catalog number).
BGN.06 Acknowledgement Version Number ( number length 4 - values 1 to 9999).

TABLE 3-continued

BGN.03 Acknowledgement Date: (string length 10 - format mm/dd/yyyy).
BGN.04 Acknowledgement Time: (string length 8 - format hh:mm:ss).
BGN.05 Acknowledgement Time Code (string length 2 - value ES = Eastern Standard Time)
N1.02 Acknowledgement Contact: Customer (string length 32 - i.e.: Natalie Wong).
PER.02 Acknowledgement phone number (number length 10 - format 9999999999).
Acknowledgment Detail (occurs once for each catalog system ID):
Record tag: DTL
OTI.01 Application acknowledgement code: (string length 2, value IA = item accept, IR = item reject)
OTI.02 Original transaction identifier: (string length 3, value TN = transaction reference nbr)
OTI.03 Original transaction number: (string length 30, value = System ID number from Catalog File)
TED.02 Item reject text: (string length 60, value is free form text - only used if the Application ack code = IR)
Trailer record (occurs once for each catalog acknowledgment file):

Record tag: TRL
SE.01 RECORD COUNT: NUMBER, LENGTH 7

Catalog acknowledgement data structure 402 includes a number of portions as well as elements within these portions. More specifically, the Catalog acknowledgement data structure 402 includes an Acknowledgement Header portion, an Acknowledgment Detail portion and a Trailer portion. The Acknowledgement Header portion includes a number of data elements that apply to the entire Acknowledgement. The Acknowledgement Detail portion includes a number of elements relating to the detail of the acknowledgement. The Trailer portion allows for an application program to validate that all records for an acknowledgement are complete.

The Acknowledgement Header portion includes a plurality of elements that enable acknowledgement of a commodity or non-commodity catalog. More specifically, the Reference ID element provides a reference to the catalog number from the Catalog data structure. The Acknowledgement Version Number element, the Acknowledgement Date element, the Acknowledgement Time element, and the Acknowledgement Time Code element all provide information relating to the acknowledgement of receipt of the catalog.

The Acknowledgement Detail portion includes a plurality of elements relating to the acknowledgement of receipt of the catalog. More specifically, the Application acknowledgement code element indicates whether each configuration in the catalog (commodity and non-commodity) is accepted or rejected. The Item reject text provides the reason why a configuration in the catalog is rejected.

Table 4 sets forth the PFF data structure and translation for the Order data structure 404.

TABLE 4

File name =

DELLUSA + Date (ccyymmdd) + Sequence number(XXX) + extension
Example: DELLUSA19990608001.ORDER
File Wrapper:
Record tag: RTG
From source: string length 10 ("CUSTOMERUSA")
To destination: string length 30 ("DELLUSA")

TABLE 4-continued

File type: string 15 ('ORDER")
ORDER HEADER (occurs once for each order):
Record tag: OHDR Sender ISA control number: (number length 15)
Sender GS control number: (number length 15)
Sender TS control number: (number length 9)
Translation DateTime Stamp (string length 8 -format mmddyyyy)
File reference Id: (string length 15 - unique file id that order is sent in)
BEG.01 Transaction purpose code: (string length 2, value 00 = Original)
BEG.02 Purchase order type: (string length 2, value LE for Lease or PO for Purchase)
BEG.03 Purchase order number: (string length 22)
BEG.04 Purchase order release number: (string length 30)
BEG.05 Purchase order date: (string length 8 - format mmddyyyy)
CUR.02 Currency code: (string length 3 - values = USD, future use of CAN)
CUR.03 Exchange Rate: (string number 10)
CUR.05 Exchange From Currency/To Currency: (string 10)
DTM.02(1) Order Processed Date: (string length 8 - format mmddyyyy).
DTM.03(1) Order Processed Time: (string length 6 - format hhmmss).
DTM.04(1) Order Processed Time Code (string length 2 - value ES = Eastern Standard Time or CS = Central Standard Time)
DTM.02(2) Planned Ship Date (string length 8 - format mmddyyyy).
Address loop (occurs twice, once for bill to, once for ship to)
 N.101 Loop Id:(string length 3, values ST = ship to , BT = Bill to)
 N.102 Name (string length 30, values ST = Hub Prime name, BT = Customer DT&M)
 N.201 Additional Name 1 (string length 30, values ST = CSR contact name, BT = blank)
 N.301(1) Address line 1 (string length 30)
 N.302(1) Address line 2 (string length 30)
 N.301(2) Address line 3 (string length 30)
 N.401 City (string length 30)
 N.402 State (string length 2)
 N.403 Zip (string length 9)
 N.404 Country code (string length 2 values = US, future use of CN)
 PER.02 Contact name (string length 30 when ST = end user name, BT = not used)
 PER.04 Contact phone number (number length 10, format 9999999999, ST = end user phone nbr, BT = not used).
TAX.01 Sales Tax Code (String length 20 - if filled in then this is a tax exempt number and is considered non-taxable, if blank that this is a taxable order)
TD.401 (EXP only, not present when STND) Planned Ship Code (String length 5 - values are STND for standard or EXP for expedited)
TD.512 Shipping Service (String length 2 - values are 1D = one day, 2D = two day, 3D = three day, ON = overnight, DF = default shipping service per contract)
FOB.01 Shipping Payment Terms (string length 2 - BP = pay by buyer, standard shipping, PC = prepaid but charged to customer which will be used in preferred carrier situations)
REF.03 Shipping Preferred Carrier Name: (String length 30 carriers name for preferred shipping when shipping payment terms = PC)
REF.02 Shipping Preferred Account Number: (String length 35 - account number for carrier when shipping payment terms = PC)
AMT.02 Shipping Charge (number length 10 - values .01 to 9999999.99, will be zero if using preferred carrier shipping)
Reference Information (occurs up to three times if needed)
REF.02 Order reference id: (string length 3 - values RQ = Purchase Order Requisition Number
     P4 = ProjectCode
     PS = Purchase Order Suffix
     PP = Purchase Order Revision Number
REF.03 Order reference number: (string length 30)
 Length of Lease (In terms of years): (number length 1; Length of the leasing period ider record b/c some customers may not have this field included in their order file.**
CREDIT CARD PAYMENT (occurs up to three times, if using a Corporate Credit for Payment)
Record Tag: CCC
SPI.03 Credit Card number: (string length 21)
REF.02 Credit Card Type: (string length 1, values are V = Visa, M = mastercard, A = AMEX, D = Discover)
DTM.06 Credit Card expiration: (date, format = mm/yy)
SPI.05 CID: (string length 6, values are customer specific)
N.102 Credit Card Full Name: (string length 30, name as it appears on Credit Card)
  Credit Card First Name: (string length 14)
  Credit Card Middle Initial: (string length 1)
  Credit Card Last Name: (string length 15)
N.301(3) Credit Card Address Line 1: (string length 30)
N.302(3) Credit Card Address Line 2: (string length 30)
N.401(3) Credit Card City: (string length 30)
N.402(3) Credit Card State: (string length 2)

TABLE 4-continued

| | |
|---|---|
| N.403(3) | Credit Card Zip: (string length 5) |
| N.403(3) | Credit Card Zip + 4: (string length 4) |
| PERO4(2) | Credit Card Area Code: (string length 3) |
| PERO4(2) | Credit Card Phone Number: (string length 7) |
| REF.01 | Credit Card Reference Number: (string length 25) |
| MSG.01(1) | Credit Card Description 1:(string length 40) |
| MSG.01(2) | Credit Card Description 2:(string length 40) |
| MSG.01(3) | Credit Card Description 3:(string length 40) |
| MSG.01(4) | Credit Card Description 4:(string length 40) |
| | Percentage of Payment: (string length 3) |
| | Daily Limit on Charge: (string length 6) |
| ORDER DETAIL (occurs once for system ID): | |
| Record tag: ODTL | |
| PO.101 | Loop counter (number length 5 - sequential counter) |
| PO.102 | Order quantity (number length 2 - values 1 to 50) |
| PO.104 | Unit price. (number length 10 - values .01 to 9999999 99, order total) |
| PO.107 | System ID: (number length 9 - values 1 to 999999999; Dell assigned). |
| OPTION DETAIL (occurs once for each option) | |
| Record tag: OOPT | |
| SLN.01 | Option Counter: (number length 5 - sequential counter). |
| SLN.02 | Option Indicator: (string length 7). |
| | Note: See Option Indicator values. |
| SLN.04 | Option Quantity: (number length two) |
| PID.05 | Option Legend Code: (string length 7 - value 64 m, 128 m). |
| PO.301 | Option Action Code: (string length 1 - D = downgrade, U = upgrade, A = in addition, C = configuration). |
| Line Items Total (occurs once for each system + each option detail) | |
| Record tag: OAMT | |
| REF.02 | Line item count: (number, length 7) |
| AMT.02 | Line item total (number length 10 - values .01 to 9999999.99). |
| Trailer record (occurs once for each Order file): | |
| | |
| Record tag: OTRL | |
| STT.01 | RECORD COUNT: NUMBER, LENGTH 7 |
| | |
| AMT.02 | Grand Total Order Amount (number length 10 - values .01 to 9999999.99 (items total + shipping + tax)) |

Order data structure 404 includes a number of portions as well as elements within these portions. More specifically, the Order data structure 404 includes an Order Header portion, a Credit Card Payment portion, an Order Detail portion, an Option Detail portion, a Line Items Total portion and a Trailer portion. The Order Header portion provides a Header for each purchase order. The Credit Card Payment portion provides the information necessary for credit card payment. The Order Detail portion provides the specific configuration information for the order. The Option Detail portion provides the option details for the order. The Line Items Total portion provides detail used for confirming the line items of the order. The Trailer portion allows for an application program to validate that all records for an order are complete.

The Order Header portion includes a Planned Ship Code element that enables a customer to indicate that a ship date of less than or equal to a contracted lead time is desired. The element allows expedited handling to be requested while not causing an order to be rejected for being outside of a contract.

The Order Detail portion includes a System ID element which is the manufacturer quote number. When a system is a commodity system then the Order Detail portion includes all the information necessary to complete the order. I.e., no Option Detail portion is necessary.

The Option Detail portion includes elements that enable a custom, non-commodity system to be ordered. Specifically, the Option Counter element provides a count of options being ordered. The Option Indicator element indicates the type of options being ordered (see, e.g., Table 2). The Option Quantity element indicates how many of each option are being ordered. The Option Action Code element indicates that action that is being used to include a particular option in the order.

Table 5 sets forth the PFF data structure and translation for the Order Acknowledgement data structure 406.

TABLE 5

File name =
   CUSTOMERUSA + Date (ccyymmdd) + Sequence number(XXX) + extension
   Example: CUSTOMERUSA19990608001.ORDERACK
File Wrapper:
Record tag: RTG
From source: string length 30 ("DELLUSA")
To destination: string length 10 ("CUSTOMERUSA")
File type: string 15 ('ORDERACK")
ACK HEADER (occurs once for each order):
Record tag: AHDR

| | |
|---|---|
| BAK.08 | Order File reference Id: (string length 15 - order file id that order was sent in) |
| BAK.01 | Transaction purpose code: (string length 2, value 00 = Original) |
| BAK.02 | Acknowledgement type: (string length 2, value AD = Ack w/detail, no change) |
| BAK.03 | Purchase order number: (string length 22) |
| BAK.04 | Purchase order date: (string length 10 - format mmddyyyy) |
| DTM.02(1) | Order Acknowledgment Date: (string length 8, format mmddyyyy). |
| DTM.03(1) | Order Acknowledgment Time: (string length 6, format hhmmss). |
| DTM.04(1) | Order Acknowledgment Time Code: (string length 2, value ES = Eastern Standard Time) |

ACK DETAIL (occurs once for each ORDER DETAIL from Order):
Record tag: ADLT

| | |
|---|---|
| PO1.06 | Ack Detail qualifier: (string length 2, value = CF for system, OP = Option) |

TABLE 5-continued

| | |
|---|---|
| PO.101/sln.01 | Line Item: (number length 5, loop counter from CF and OP records). |
| PO.102/sln.04 | Order quantity: (number length 2, value 1 to 50) |
| PO.104/sln.06 | Unit price: (number length 10, value .01 to 9999999.99) |
| PO.107/SLN.10 | Reference ID: (number length 9, value 1 to 999999999, when Ack Detail Qual = CF then this will be the system Id, when Ack Detail Qual. = OP will be the Option Legend Code) |
| ACK STATUS (occurs once for each Ack Detail Record) | |
| Record tag: ASTS | |
| ACK.01 | Line Item Status Code: (string length 2, IA = item accepted, IR = item rejected) |
| ACK.02 | Line Item Error Counter: (number length 3, if Line Item Status Code = IR, total number of errors, If Line Item Status Code = IA, then this will be blank.) |
| AMT (occurs once for each Dell order, 1:M relationship from PO:Dell Order): | |
| Record tag: AMT | |
| N9.02 | Dell Order Number: (string length 10) |
| AMT.02 | Confirmed Order Total: (number length 10 value .01 to 9999999.99) |
| | Confirmed Shipping Total: (number length 10 value .01 to 9999999.99) |
| | Confirmed Tax Total: (number length 10, value .01 to 9999999.99) |
| | Confirmed Line Item Total: (number length 10) |
| DTM02(2) | Order Expected Ship Date: (string length 8, format mmddyyyy). |
| ACK ERROR (Each error when ASTS record status = IR) | |
| Record tag: AERR | |
| ACK.06 | Line Item IR error msg: (string length 45 - if status code = IR, error message) |
| Trailer record (occurs once for each Order Ack file): | |
| Record tag: TRL | |
| CTT.01 | Total number of line items (number length 10). |

Order acknowledgement data structure 406 includes a number of portions as well as elements within these portions. More specifically, the Order acknowledgement data structure 406 includes an Acknowledgement Header portion, an Acknowledgment Detail portion, an Acknowledgement Status portion and a Trailer portion. The Acknowledgement Header portion includes a number of data elements that apply to the entire Acknowledgement. The Acknowledgement Detail portion includes a number of elements that provide the detail of the acknowledgement. The Acknowledgement status portion includes a number of elements that relate to the status of the acknowledgement, to acknowledge each option and system ID in an original order. The Trailer portion allows for an application program to validate that all records for an acknowledgement are complete.

Other embodiments

Other embodiments are within the following claims.

For example, while the preferred embodiment is set forth with reference to specific EDI transaction sets, other industry standard formats such as, but not limited to, XML or HTML are also within the scope of the invention.

Attachments A–D set forth the EDI transaction layouts that substantially conform to the ANSI EDI transaction sets 832, 824, 850, and 855, respectively. These transaction sets have been tailored from the ANSI industry standards to implement transaction sets that function with both commodity and non-commodity products.

ATTACHMENT A

832 Price/Sales Catalog
Functional Group ID = SC

Introduction:

This Standard contains the format and establishes the data contents of the Price/Sales Catalog Transaction Set (832) for use within the context of an Electronic Data Interchange (EDI) environment. The transaction set can be used to provide for customary and established business and industry practice relative to furnishing or requesting the price of goods or services in the form of a catalog.

Heading:

| | Pos. No. | Seg. ID | Name | Req. Des. | Max.Use | Loop Repeat | Notes and Comments |
|---|---|---|---|---|---|---|---|
| M | 010 | ST | Transaction Set Header | M | 1 | | |
| M | 020 | BCT | Beginning Segment for Price/Sales Catalog | M | 1 | | |
| | 070 | DTM | Date/Time Reference | O | 10 | | |
| | 090 | CUR | Currency | O | 5 | | |
| | | | LOOP ID-NI | | | >1 | |
| | 150 | NI | Name | O | 1 | | |
| | 200 | PER | Administrative Communications Contact | O | >1 | | |

Detail:

| Pos. No. | Seg. ID | Name | Req. Des. | Max.Use | Loop Repeat | Notes and Comments |
|---|---|---|---|---|---|---|
| | | LOOP ID-LIN | | | >1 | |
| 010 | LIN | Item Identification | O | 1 | | |
| 015 | G53 | Maintenance Type | O | 1 | | n1 |
| 030 | DTM | Date/Time Reference | O | 10 | | |
| 040 | REF | Reference Identification | O | >1 | | |
| 070 | PID | Product/Item Description | O | 200 | | |

-continued

832 Price/Sales Catalog
Functional Group ID = SC

| | | | | | |
|---|---|---|---|---|---|
| 166 | TXI | Tax Information | O | >1 | |
| | | LOOP ID-CTP | | | 100 |
| 170 | CTP | Pricing Information | O | 1 | |
| | | LOOP ID-SLN | | | >1 |
| 350 | SLN | Sublime Item Detail | O | 1 | |
| 360 | SI | Service Characteristic Identification | O | >1 | |
| 370 | PID | Product/Item Description | O | >1 | |
| 390 | CTP | Pricing Information | O | >1 | |
| 450 | SAC | Service, Promotion, Allowance, or Charge Information | O | >1 | |

What is claimed is:

1. A method for translating a data structure for providing a catalog from a manufacturer to a customer from a first file to a second file format so as to enable a customer to perform an automated order entry process, the first file format and the second file format being encoded on compute readable media, the method comprising:

translating a catalog header portion from the first file format to a corresponding set of elements in the second file format;

translating a system identification portion from the first file format to a corresponding set of elements it the second file form a, the system identification portion including a system type indicator, the system type indicator inhabiting weather a system is a bundled system or a custom system;

a system effective date element, the system effective date element indicating an effective date that a particular configuration is allowed to be purchased;

a system discontinue data element, the system discontinue date element indicating a data by which a system is to be discouraged; and, translating a system option portion from the firs file format to a corresponding set of elements in the second file format.

2. The method of claim 1, wherein the firm file format is a proprietary file format and the second file format is an industry standard file format.

3. The method of claim 2, wherein the second file format substantially conforms to an electronic data interchange (EDI) format.

4. The method of claim 1 wherein the system identification portion includes a plurality of business rule elements that apply to a particular system.

5. The method of claim 4 wherein the plurality of business rule elements include a system identification element, the system identification element providing a manufacture assigned unique identifier.

6. The method of claim 4 wherein the plurality of business rule elements include the system identification effective date element, the system identification effective date element providing an effective date that a particular configuration is allowed to be purchased.

7. The method of claim 4 wherein the plurality of business rule elements include a system of identification action element, the system identification action element programmable informing a customer what function to perform a system.

8. The method of claim 7 wherein the functions to be performed include an add function, a replace function and a discontinue function.

9. The method of claim 1 wherein the system option portion includes a plurality of relationship indicator elements.

10. The method of claim 9 wherein the plurality of relationship indicator elements include a relationship identification element, the relationship identification element providing an indicator that communicates for a component, a relationship of the component to other components.

* * * * *

UNITED STATES PATENT AND TRADEMARK OFFICE
CERTIFICATE OF CORRECTION

PATENT NO. : 6,871,187 B1
APPLICATION NO. : 09/592739
DATED : March 22, 2005
INVENTOR(S) : Theresa M. Gosko Page 1 of 1

It is certified that error appears in the above-identified patent and that said Letters Patent is hereby corrected as shown below:

Claim 1, column 17, line 19, --format-- should be inserted prior to "to a second file format"

Claim 1, column 17, line 21, "compute" should be "computer"

Claim 1, column 17, line 27, "it" should be "in"

Claim 1, column 17, line 28, "form a," should be "format"

Claim 1, column 17, line 30, "inhabiting weather" should be "indicating whether"

Claim 1, column 17, line 36, "data" should be "date"

Claim 1, column 17, line 37, "data" should be "date"

Claim 1, column 17, line 39, "discouraged" should be "discontinued"

Claim 1, column 17, line 40, "firs" should be "first"

Claim 2, column 17, line 43, "firm" should be "first"

Claim 7, column 18, line 33, "programmable" should be "programmably"

Claim 7, column 18, line 33, insert --on-- after "perform"

Signed and Sealed this
Sixth Day of December, 2011

David J. Kappos
*Director of the United States Patent and Trademark Office*